United States Patent [19]

Gubser et al.

[11] 4,301,650

[45] Nov. 24, 1981

[54] PRESSURE REGULATING APPARATUS FOR A CLOSED WATER CIRCUIT

[75] Inventors: Hans-Rudolf Gubser, Zurich; Rolf Kehlhofer, Dielsdorf, both of Switzerland

[73] Assignee: BBC Brown, Boveri & Co. Ltd., Baden, Switzerland

[21] Appl. No.: 60,965

[22] Filed: Jul. 26, 1979

[30] Foreign Application Priority Data

Jul. 28, 1978 [CH] Switzerland .................... 8118/78

[51] Int. Cl.³ .................... F02C 1/00; F22D 1/00
[52] U.S. Cl. .................... 60/39.18 B; 122/7 R; 122/1 R; 122/451.2
[58] Field of Search ............ 122/7 R, 1 R, 421, 451.2; 60/39.18 B

[56] References Cited

U.S. PATENT DOCUMENTS

| | | | |
|---|---|---|---|
| 2,395,583 | 2/1946 | Saco, Jr. et al. | 122/7 R |
| 3,177,659 | 4/1965 | Berman | 122/7 R |
| 3,422,800 | 1/1969 | La Haye | 122/7 R |
| 3,807,364 | 4/1974 | Schwartz | 122/7 R |
| 3,841,270 | 10/1974 | Sokolowski | 122/7 R |
| 4,101,265 | 7/1978 | Broach et al. | 122/7 R |
| 4,184,325 | 1/1980 | Maudrin | 122/7 R |

*Primary Examiner*—Henry C. Yuen
*Attorney, Agent, or Firm*—Burns, Doane, Swecker & Mathis

[57] ABSTRACT

A method and apparatus for regulating the pressure of water in a closed hot water circuit is disclosed. The apparatus includes a closed hot water circuit and a steam circuit, which water circuit and steam circuit are both heated by relatively hot waste gases exhausted from a gas turbine power plant. Two water lines link the water circuit to the steam circuit. A valve in each of these lines regulates a flow of water through each of the lines. A pressure sensor senses the pressure of the water in the water circuit. The pressure sensor communicates said pressure to a valve regulator, which valve regulator regulates the opening and closing of the valves in the water lines.

12 Claims, 2 Drawing Figures

PRESSURE REGULATING APPARATUS FOR A CLOSED WATER CIRCUIT

BACKGROUND AND SUMMARY OF THE PRESENT INVENTION

The invention disclosed herein pertains to a method and apparatus for regulating the pressure of the water in a closed water conducting circuit, downstream from a steam conducting circuit, which water circuit and steam circuit are both heated by a common source of heat.

Steam boilers may be heated with a waste heat carried by gases exhausted from a gas turbine. Because the temperature of these gases at the gas turbine stack outlet is often relatively high it is economically feasible to install a first heat exchanger, downstream from the steam boiler, by means of which a primary water may be heated. The primary water heated with the first heat exchanger may be circulated through a closed water conducting circuit which includes at least a second heat exchanger. The second heat exchanger can be used for heating various secondary fluids, for example, secondary water to be used in heating systems, and air. The heated primary water flows through the closed water conducting circuit which is arranged intermediate the gas turbine exhaust stack and the secondary fluid to be heated by the primary water.

The intermediate water circuit must be under pressure in order to avoid evaporation of the hot primary water. Because of the limited structural stability of the water conducting components of the intermediate water circuit, i.e., the limited structural stability of the pipes and heat exchangers, the pressure in the intermediate water circuit must not exceed a specified pressure. For this reason, a pressure regulating device must be provided which controls and limits the variation of the pressure in the intermediate circuit to within a specified range.

Accordingly, a primary object of the present invention is to utilize the waste heat from a gas turbine generator to heat a steam conducting circuit and a pressurized water conducting circuit, while avoiding structural damage to the water conducting circuit.

Yet a further object of the present invention is to regulate the pressure of the water in the pressurized water conducting circuit.

Apparatus for regulating the pressure of the water in a pressurized, closed water conducting circuit downstream from a steam conducting circuit, which steam circuit and water circuit are heated by a waste heat from a gas turbine generator, according to the present invention, includes a gas turbine generator, a steam circuit, and a pressurized water circuit. The steam circuit includes a steam boiler, a steam turbine generator, and a water tank with a degassing dome. The pressurized water circuit includes a heat exchanger downstream from the steam boiler, and an expansion tank which provides a volume expansion capacity for the water circuit. First and second water lines link the steam circuit to the water circuit. Valves in these water lines regulate a flow of water between the water circuit and the steam circuit. A pressure sensor senses the pressure of the water in the water circuit, and a valve regulator opens and closes the valves in the first and second water lines in response to signals from the pressure sensor.

BRIEF DESCRIPTION OF THE DRAWINGS

Preferred embodiments of apparatus according to the present invention are described with reference to the accompanying drawings wherein like members bear like reference numerals and wherein:

With reference to FIG. 1, a gas turbine-steam turbine power plant according to the present invention includes a gas turbine generator 1. The gas turbine generator 1 includes a compressor 2, a combustion chamber 3, a gas turbine 4, and a generator 5. Hot exhaust gases from the gas turbine 4 flow into a waste heat stack 6 which houses a steam boiler 7. The steam produced in the steam boiler 7 is used to drive a steam turbine generator 8, which steam turbine generator includes a steam turbine 9, a generator 10, and a steam condenser 11. A pump 12 pumps water which has condensed in condenser 11 into a feedwater tank 13 where the water is degassed. A feedwater pump 14 then pumps the degassed water into the boiler 7.

Figure 1:
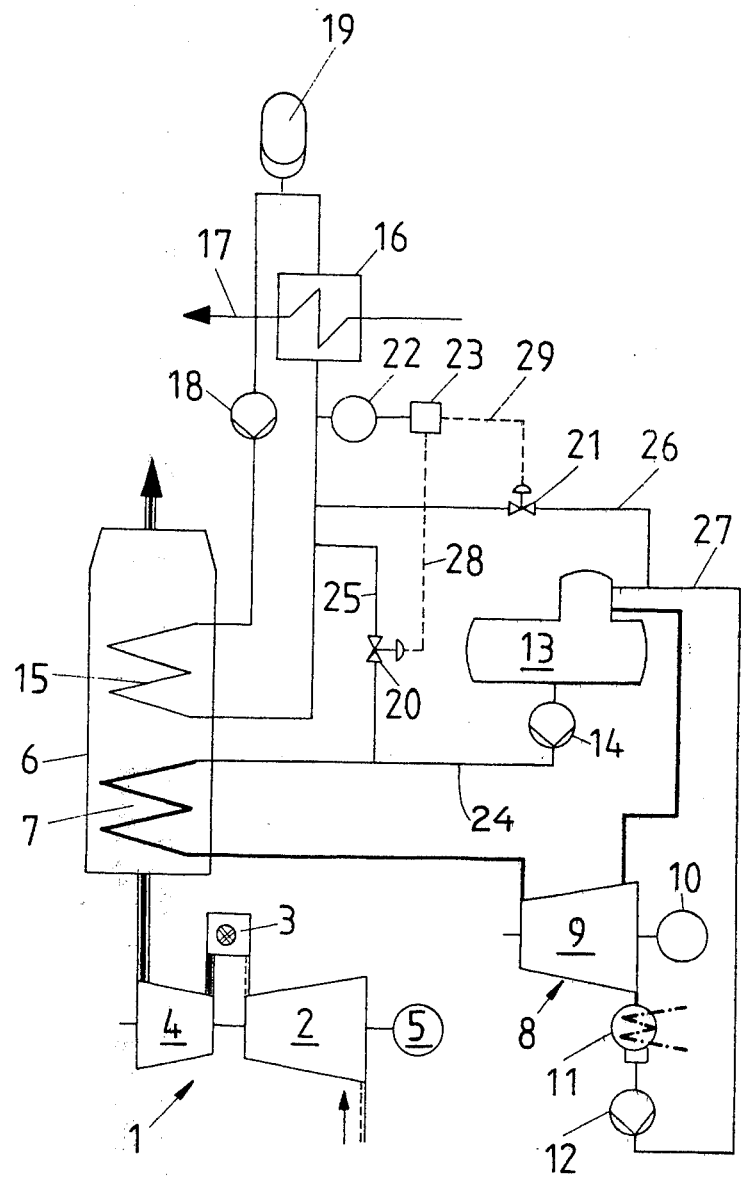
FIG. 1 is a schematic view of a gas turbine-steam turbine power plant, which power plant includes a steam circuit, a pressurized water circuit, and a first preferred embodiment of apparatus for regulating the pressure of the water in the water circuit.

A residual heat still present in the exhaust gases from the gas turbine downstream from the boiler 7, is utilized to heat a primary water flowing through an intermediate water conducting circuit. This intermediate water circuit includes a heat exchanger 15, which heat exchanger is also housed in the waste heat stack 6 downstream from the steam boiler 7. The intermediate circuit also includes one or more additional heat exchangers 16. At this heat exchanger 16, the primary water flowing through the intermediate circuit gives up its heat to a secondary water or air flowing through a circuit 17 to a consumer who consumes the heated secondary water or air. A circulating pump 18 is used to maintain a circulation of the primary water through the intermediate water circuit.

In order to compensate for a volume expansion of the primary water in the intermediate water circuit, which volume expansion cannot be borne by the relatively inflexible structural components of the intermediate circuit, a gas pressure expansion tank 19 is included in the intermediate circuit. The dimensions of the expansion tank 19 are such that, within a specific fluctuation range, it alone can absorb the pressure and volume changes of the primary water. Thus, the expansion tank 19 increases the expansibility or compressibility of the intermediate circuit, and helps to preserve the structural integrity of the intermediate circuit.

Apparatus for regulating a pressure of the water in the intermediate circuit, which apparatus is used when a relatively large pressure or volume fluctuation cannot be absorbed by the expansion tank 19, includes an intake line 25 and a drain line 26, which lines connect the intermediate circuit to the steam circuit. Line 25, which connects a line 24 in the steam circuit to the intermediate circuit, is an inlet line which provides a flow path for water to flow from the steam circuit into the intermediate circuit. Line 26, which connects the intermediate circuit to a line 27 in the steam circuit, is a drain line which provides a flow path for water to flow from the intermediate circuit into the steam circuit. A valve 20 in the intake line 25, and a valve 21 in the drain line 26, regulate the flow of water between the intermediate circuit and the steam circuit, and thereby regulate the pressure of the water in the intermediate circuit.

The opening and closing of the valves 20 and 21 is regulated by a valve regulator 23. This valve regulator is connected to the valve 20 by a signal line 28, and is connected to the valve 21 by a signal line 29. The valve regulator 23 responds to signals from a pressure sensor 22, which pressure sensor senses the pressure of the water in the intermediate circuit. The valve regulator opens and closes valves 20 and 21 so as to prevent the pressure of the water in the intermediate circuit from exceeding a predetermined pressure.

The operation of the pressure regulating apparatus described above is as follows. If the pressure of the water in the intermediate circuit drops, the valve regulator 23 causes intake valve 20 to open and a makeup water to be pumped from the steam circuit into the intermediate circuit. This makeup water is taken from the line 24 in the steam circuit and passed under pressure through the line 25 into the intermediate circuit. The removal of this makeup water from the steam circuit takes place at a relatively high pressure zone downstream from the feedwater pump 14 where the makeup water is already degassed and its pressure is sufficiently high, i.e., higher than the pressure of the water in the intermediate circuit.

If the pressure of the water in the intermediate circuit rises, the valve regulator 23 causes an opening of the drain valve 21. The water which flows out from the intermediate circuit flows through the line 26 into the line 27 at a relatively low pressure zone upstream from the feedwater tank 13. The water pressure at the zone upstream from the feedwater tank 13 is lower than the water pressure in the intermediate circuit. The water drained from the intermediate circuit could also be passed directly into the dome of the feedwater tank 13 where degassing takes place.

Figure 2:
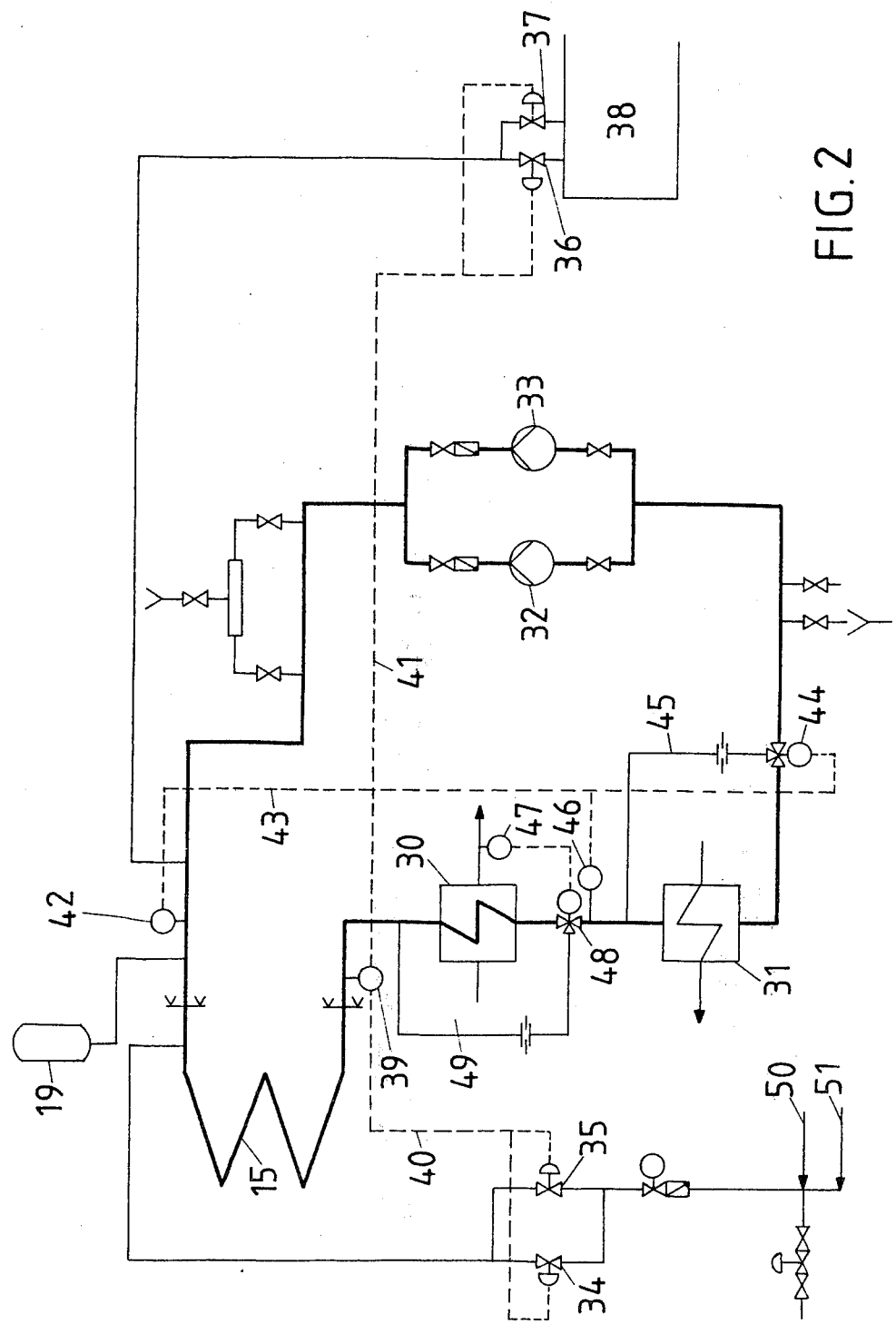
FIG. 2 is a schematic view of the water circuit, isolated from the gas turbine-steam turbine power plant, showing a second preferred embodiment of apparatus for regulating the pressure of the water in the water circuit according to the present invention.

With reference to FIG. 2, a second preferred embodiment of the intermediate water circuit, and a second preferred embodiment of apparatus for regulating the pressure of the water in the intermediate circuit, includes the heat exchanger 15, as before, as well as two additional heat exchangers 30 and 31. The heat exchanger 30 may be used, for example, to preheat feedwater while the heat exchanger 31 is used for producing hot water. The embodiment shown in FIG. 2 also differs from the embodiment shown in FIG. 1 in that two circulating pumps 32 and 33, rather than one pump, are used to circulate water through the intermediate circuit. These two circulating pumps are arranged in parallel in the intermediate circuit.

The preferred embodiment shown in FIG. 2 also differs from the embodiment shown in FIG. 1 in that the intake line for the intermediate circuit has two regulating valves 34 and 35, rather than one, while the drain line also has two regulating valves 36 and 37. With respect to each of these two sets of valves, one valve is always smaller than the other. During a pressure regulating operation the smaller valve is opened first, and the larger valve is only opened if a pressure fluctuation is too large to be suppressed by the opening of the smaller valve. This permits for a more delicate and sensitive regulation of the pressure in the intermediate circuit.

In the embodiment shown in FIG. 2, the water drained from the intermediate circuit flows into a tank 38, which tank contains makeup water for the steam circuit.

Unlike the embodiment in FIG. 1, which includes a separate pressure sensor and a separate valve regulator, the embodiment in FIG. 2 includes a unified sensing and regulating device 39 which incorporates a pressure sensor and a valve regulating device. The unified regulating device 39 is connected to the two valves 34 and 35 in the intake line by a signal line 40, and is connected to the valves 36 and 37 in the drain line by a signal line 41. The unified regulating device 39 senses a pressure of the water in the intermediate water circuit, and regulates this pressure by regulating the opening and closing of the valves 34, 35, 36, and 37.

In order to avoid a possibility of overheating the intermediate water circuit, a bypass line 49 permits the heat exchanger 30 to be short-circuited, and a bypass line 45 permits the heat exchanger 31 to be short-circuited. Temperature sensors 46 and 47 sense a temperature of the water in the intermediate water circuit, which temperature is communicated to a valve regulator 42. The valve regulator 42 communicates with a three-way valve 44 through a signal line 43, which valve 44 is located at a juncture of the intermediate circuit and the bypass line 45. The valve regulator 42 regulates the opening and closing of the three-way valve 44, and thereby regulates a flow of water through the bypass circuit 45. Similarly, the valve regulator 42 regulates the opening and closing of another three-way valve 48, which valve 48 is located at a juncture of the intermediate circuit and the bypass line 49. By regulating the opening and closing of the three-way valve 48, the valve regulator 42 regulates a flow of water through the bypass line 49.

Two water lines 50 and 51, coming from two feedwater pumps, represent a connection between the intermediate water circuit and the steam circuit.

The principles, preferred embodiments and modes of operation of the present invention have been described in the foregoing specification. The invention which is intended to be protected herein, however, is not to be construed as limited to the particular forms disclosed, since these are to be regarded as illustrative rather then restrictive. Variations and changes may be made by those skilled in the art without departing from the spirit of the present invention.

What is claimed is:

1. In a closed hot water circuit of the type including a heat exchanger for absorption of a waste gas heat and at least one heat exchanger for a transfer of heat from relatively hot water in the closed hot water circuit to a medium to be heated, and a pressure regulating device for regulation of the water pressure in said circuit, the improvement wherein said pressure regulating device comprises:

a gas expansion tank arranged in said closed hot water circuit, which tank is capable of absorbing pressure and volume fluctuations of the hot water which fall within a specified range;

at least one inlet valve communicating with said hot water circuit for admitting water to said circuit;

at least one drain valve communicating with said hot water circuit for withdrawing water from said circuit; and pressure regulating means for sensing the water pressure in said hot water circuit and for actuating the at least one inlet valve when the water pressure falls below a preselected value to admit water to said circuit, and for actuating said at least one drain valve when the water pressure exceeds a preselected value to withdraw water from said circuit.

2. In the closed hot water circuit of claim 1, wherein a relatively small valve and a relatively large valve are provided for admitting water to the circuit, a relatively small valve and a relatively large valve are provided for withdrawing water from the circuit, each of the relatively large valves being opened only after the corresponding relatively small valve is opened in order to more accurately control the water pressure in the circuit.

3. A method for regulating the pressure of water in a closed hot water circuit comprising the steps of:
heating the water in said closed hot water circuit at a first location in said hot water circuit;
withdrawing heat from the water in said hot water circuit at a second location in said hot water circuit;
absorbing pressure and volume fluctuations of the hot water which fall within a specified range in an expansion tank;
sensing the pressure of the water in said hot water circuit; and
regulating the pressure of the water in said circuit by admitting water to said circuit when the pressure of the water in the circuit falls below a preselected value by opening an inlet valve, and withdrawing water from said circuit when the pressure of the water in the circuit exceeds a preselected value by opening a drain valve.

4. The method for regulating the pressure of water in a closed hot water circuit as in claim 3, further comprising the steps of:
exhausting relatively hot waste gases from a gas turbine;
heating a portion of a steam circuit with said hot waste gases to convert water in said steam circuit to steam, which steam is used to drive a steam turbine power plant; and wherein
the water in the closed hot water circuit is heated with said hot waste gases; and
the pressure of the water in the closed hot water circuit is regulated by transferring water from the steam circuit to the water circuit through the inlet valve when the pressure of the water in the water circuit falls below a preselected value, and transferring water from the water circuit to the steam circuit through the drain valve when the pressure of the water in the water circuit exceeds the preselected value.

5. In a closed hot water circuit of the type including a heat exchanger for absorption of a waste gas heat and at least one heat exchanger for a transfer of heat from relatively hot water in the closed hot water circuit to a medium to be heated, and a pressure regulating device for regulation of water pressure in said circuit, the improvement wherein said pressure regulating device comprises:
a steam circuit which conducts both steam and water, which steam circuit includes a relatively high pressure zone, and a relatively low pressures zone;
a source of heat which heats a portion of said steam circuit, and a portion of said hot water circuit;
valve means communicating with said hot water circuit for admitting water to, and withdrawing water from, said circuit, said valve means including
a water inlet line which is connected to the steam circuit and the water circuit to provide a flow path between the steam circuit and the water circuit, and which water inlet line is connected to the steam circuit at the relatively high pressure zone,
a water drain line which is connected to the steam circuit and the water circuit to provide a flow path between the steam circuit and the water circuit, and which water drain line is connected to the steam circuit at the relatively low pressure zone,
a valve in the water inlet line, which valve regulates a flow of water through said inlet line,
a valve in the water drain line, which valve regulates a flow of water through said drain line; and
pressure regulating means for sensing the water pressure in said hot water circuit and for actuating the valve in the water inlet line when the water pressure falls below a preselected value to admit water to said water circuit, and for actuating said valve in the water drain line when the water pressure exceeds a preselected value to withdraw water from said water circuit.

6. In the closed hot water circuit of claim 5 wherein said pressure regulating means includes:
a pressure sensor which senses a pressure of the hot water in the closed hot water circuit; and
a valve regulator in communication with said pressure sensor, which valve regulator actuates the opening and closing of the valves in the water inlet and water drain lines.

7. In a closed hot water circuit of the type including a heat exchanger for absorption of a waste gas heat and at least one heat exchanger for a transfer of heat from relatively hot water in the closed hot water circuit to a medium to be heated, and a pressure regulating device for regulation of water pressure in said circuit, the improvement wherein said pressure regulating device comprises:
a steam circuit which conducts both steam and water, which steam circuit includes a relatively high pressure zone, and a relatively low pressure zone;
a source of heat which heats a portion of said steam circuit, and a portion of said hot water circuit;
valve means communicating with said hot water circuit for admitting water to, and withdrawing water from, said circuit, said valve means including
a water inlet line which is connected to the steam circuit and the water circuit to provide a flow path between the steam circuit and the closed hot water circuit, which water inlet line is connected to the steam circuit at the relatively high pressure zone,
a water drain line which is connected to the steam circuit and the water circuit to provide a flow path between the steam circuit and the closed hot water circuit, which water drain line is connected to the steam circuit at the relatively low pressure zone,
a first relatively small valve and a first relatively large valve in the water inlet line, which first valves regulate a flow of water through said inlet line, and which first relatively large valve is opened only after the first relatively small valve is opened,
a second relatively small valve and a second relatively large valve in the water drain line, which second valves regulate a flow of water through said drain line, and which second relatively large valve is opened only after the second relatively small valve is opened; and pressure regulating means for sensing the water pressure in said hot water circuit and for actuating at least the first relatively small valve when the water pressure falls below a preselected value to admit water to said water circuit, and for actuating at least the second relatively small valve when the water pressure exceeds a preselected value to withdraw water from said water circuit.

8. In the closed hot water circuit of claim 7 wherein said pressure regulating means includes a combined pressure sensor and valve regulator which senses the water pressure in the hot water circuit and which actuates the opening and closing of the valves in the water inlet and water drain lines.

9. Apparatus for regulating the pressure of a fluid in a closed fluid circuit comprising:

a closed fluid circuit;

first heat exchange means for adding heat to the fluid in said closed fluid circuit;

second heat exchange means for withdrawing heat from the fluid in said closed fluid circuit, said second heat exchange means including
   at least one heat exchanger arranged in said fluid circuit,
   bypass means for sensing a temperature of the fluid in said heat exchanger, and for bypassing the fluid around said heat exchanger if the temperature exceeds a predetermined value;

valve means communicating with said closed fluid circuit for admitting fluid to, and withdrawing fluid from, said circuit; and pressure regulating means for sensing the pressure of the fluid in said circuit and for actuating the valve means when the pressure falls below a preselected value to admit fluid to said circuit, and for actuating said valve means when the pressure exceeds a preselected value to withdraw fluid from said circuit.

10. Apparatus in accordance with claim 9 wherein said bypass means includes:

a fluid bypass line which is connected to said closed fluid circuit in parallel with said heat exchanger; and a three-way valve, located at a juncture of said fluid bypass line and said closed fluid circuit, which valve regulates a flow of fluid through said bypass line.

11. Apparatus in accordance with claim 10 wherein said bypass means further includes:

a temperature sensor which senses the temperature of the fluid in the heat exchanger; and a valve regulator, in communication with said temperature sensor, which valve regulator actuates the opening and closing of the three-way valve.

12. Apparatus in accordance with claim 9, wherein the fluid is water, and further comprising:

a gas turbine power plant which includes a gas turbine from which relatively hot waste gases are exhausted;

a steam circuit which includes a steam boiler, a steam turbine power plant, and a steam condenser, which steam boiler is heated by said hot waste gases;

said closed fluid circuit comprising a closed hot water circuit which includes the first heat exchange means where heat from said hot waste gases is absorbed by the water in said circuit, and the second heat exchange means where heat is withdrawn from the water in said circuit;

said valve means communicating with said hot water circuit and said steam circuit for transferring water from said steam circuit to said hot water circuit and for transferring water from said hot water circuit to said steam circuit; and said pressure regulating means sensing the pressure of the water in said hot water circuit and actuating the valve means when the pressure falls below the preselected value to transfer water from said steam circuit to said water circuit, and actuating said valve means when the pressure exceeds the preselected value to transfer water from said water circuit to said steam circuit.

* * * * *